US012566162B2

(12) United States Patent  
Francois et al.

(10) Patent No.: US 12,566,162 B2  
(45) Date of Patent: Mar. 3, 2026

(54) AUTOMATED CONTAMINANT SEPARATION IN GAS CHROMATOGRAPHY

(71) Applicant: SCHLUMBERGER TECHNOLOGY CORPORATION, Sugar Land, TX (US)

(72) Inventors: Matthias Francois, Clamart (FR); Elena Borisova, Clamart (FR); Jean-Pierre Bailly, Clamart (FR); Jerome Breviere, Clamart (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 19/100,714

(22) PCT Filed: Aug. 2, 2022

(86) PCT No.: PCT/IB2022/000440  
§ 371 (c)(1),  
(2) Date: Feb. 3, 2025

(87) PCT Pub. No.: WO2024/028624  
PCT Pub. Date: Feb. 8, 2024

(65) Prior Publication Data  
US 2025/0258148 A1 Aug. 14, 2025

(51) Int. Cl.  
*G01N 30/86* (2006.01)  
*B01D 53/02* (2006.01)  
*G01N 30/02* (2006.01)

(52) U.S. Cl.  
CPC ......... *G01N 30/8631* (2013.01); *B01D 53/02* (2013.01); *G01N 30/8665* (2013.01); *B01D 2256/24* (2013.01); *G01N 2030/025* (2013.01)

(58) Field of Classification Search  
CPC ........... G01N 30/8631; G01N 30/8665; G01N 2030/025; B01D 53/02; B01D 2256/24  
See application file for complete search history.

(56) References Cited

U.S. PATENT DOCUMENTS 5,121,443 A * 6/1992 Tomlinson ......... G01N 30/8624  
73/23.23  
5,340,543 A * 8/1994 Annino .................. G01N 30/88  
422/89

(Continued)

OTHER PUBLICATIONS

Borovcova et al., Simple area determination of strongly overlapping ion mobility peaks, Elsevier, 2017 (Year: 2017).*

(Continued)

*Primary Examiner* — Kyle R Quigley  
(74) *Attorney, Agent, or Firm* — Kyle R. Miiller

(57) ABSTRACT  
A method for evaluating an unknown gas sample includes acquiring a chromatogram of the unknown gas sample and processing the chromatogram to identify a peak. The peak is evaluated to determine if it is representative of a single gas species in the unknown gas sample. The peak is fit with at least first and second curves when the peak is not representative of a single gas species. First and second areas under the corresponding first and second curves are computed and processed to compute a composition of the unknown gas sample or a ratio of concentrations of individual gases in the unknown gas sample.

18 Claims, 9 Drawing Sheets

(56) References Cited

U.S. PATENT DOCUMENTS

| | | | | |
|---|---|---|---|---|
| 5,783,741 | A * | 7/1998 | Ellis | G01N 30/84 |
| | | | | 422/89 |
| 6,952,945 | B2 | 10/2005 | Robert | |
| 9,638,681 | B2 | 5/2017 | Zhdaneev et al. | |
| 2005/0123452 | A1 * | 6/2005 | Mueller | G01N 30/40 |
| | | | | 422/89 |
| 2008/0105032 | A1 | 5/2008 | Reddy et al. | |
| 2009/0008560 | A1 * | 1/2009 | Gunn | G01N 21/3504 |
| | | | | 250/343 |
| 2009/0228245 | A1 * | 9/2009 | Gilbert | G01N 30/8624 |
| | | | | 703/2 |
| 2010/0299078 | A1 * | 11/2010 | Guieze | G01N 30/8675 |
| | | | | 702/24 |
| 2011/0226941 | A1 * | 9/2011 | Gorenstein | G16C 20/20 |
| | | | | 250/281 |
| 2012/0016597 | A1 * | 1/2012 | Sutan | G01N 30/8665 |
| | | | | 702/24 |
| 2012/0083041 | A1 * | 4/2012 | Martin | H01J 49/0009 |
| | | | | 436/141 |
| 2013/0085674 | A1 * | 4/2013 | Zhdaneev | G01N 21/3577 |
| | | | | 702/6 |
| 2014/0025342 | A1 * | 1/2014 | Gorenstein | G16C 20/20 |
| | | | | 702/196 |
| 2014/0324362 | A1 * | 10/2014 | Andersson | H01J 49/0036 |
| | | | | 702/28 |
| 2015/0241399 | A1 * | 8/2015 | Li | G01N 33/225 |
| | | | | 73/23.31 |
| 2018/0095031 | A1 * | 4/2018 | Owen | G01N 21/39 |
| 2021/0048417 | A1 * | 2/2021 | Yamashita | G01N 30/7233 |
| 2023/0333071 | A1 * | 10/2023 | Ishikawa | G01N 30/8631 |

OTHER PUBLICATIONS

Asher et al., Comparison of peak integration methods for the determination of enantiomeric fraction in environmental samples, Elsevier, 2009 (Year: 2009).*

Harvey, Finding the area for overlapping chromatographic peaks, asdlib.org, 2013 (Year: 2013).*

Papai et al., Determination of chromatographic peak parameters by non-linear curve fitting using statistical moments, Analyst, 2002 (Year: 2002).*

Petrov et al., Raman Natural Gas Analyzer: Effects of Composition on Measurement Precision, MDPI, May 4, 2022 (Year: 2022).*

Wang et al., A New Gas Chromatography Method for Continuous Monitoring of Non-Methane Hydrocarbons as an Analogy of Volatile Organic Compounds in Flue Gas, Aerosol and Air Quality Research, 2018 (Year: 2018).*

International Search Report and Written Opinion of International Patent Application No. PCT/IB2022/000440 dated on Mar. 3, 2023, 15 pages.

Reddy, C.M. et al., "Identification And Quantification Of Alkene-Based Drilling Fluids In Crude Oils By Comprehensive Two-Dimensional Gas Chromatography With Flame Ionization Detection", Journal Of Chromatography A, Elsevier, Apr. 27, 2007, pp. 100-107, 1148(1), Science Direct, Woods Hole, MA 02543, USA.

Steffen, B. et al., "A New Mathematical Procedure To Evaluate Peaks In Complex Chromatograms", Journal Of Chromatography A, Elsevier, Apr. 15, 2005, pp. 239-246, 1071(1-2), Science Direct, 52425 Julich, Germany.

* cited by examiner

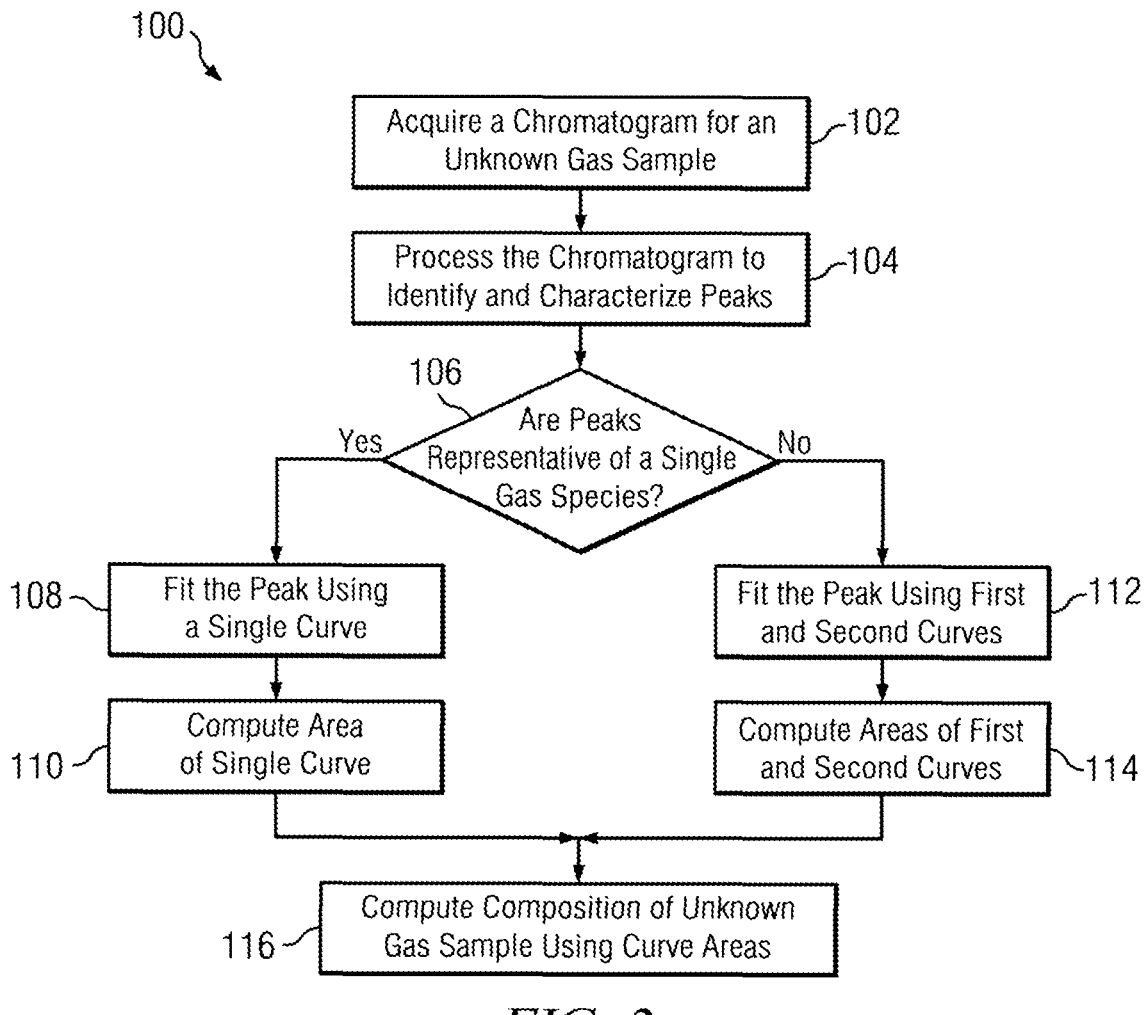

100

Acquire a Chromatogram for an Unknown Gas Sample ~102

Process the Chromatogram to Identify and Characterize Peaks ~104

106 — Are Peaks Representative of a Single Gas Species?

Yes

No

108 ~ Fit the Peak Using a Single Curve

Fit the Peak Using First and Second Curves ~112

110 ~ Compute Area of Single Curve

Compute Areas of First and Second Curves ~114

116 ~ Compute Composition of Unknown Gas Sample Using Curve Areas

*FIG. 2*

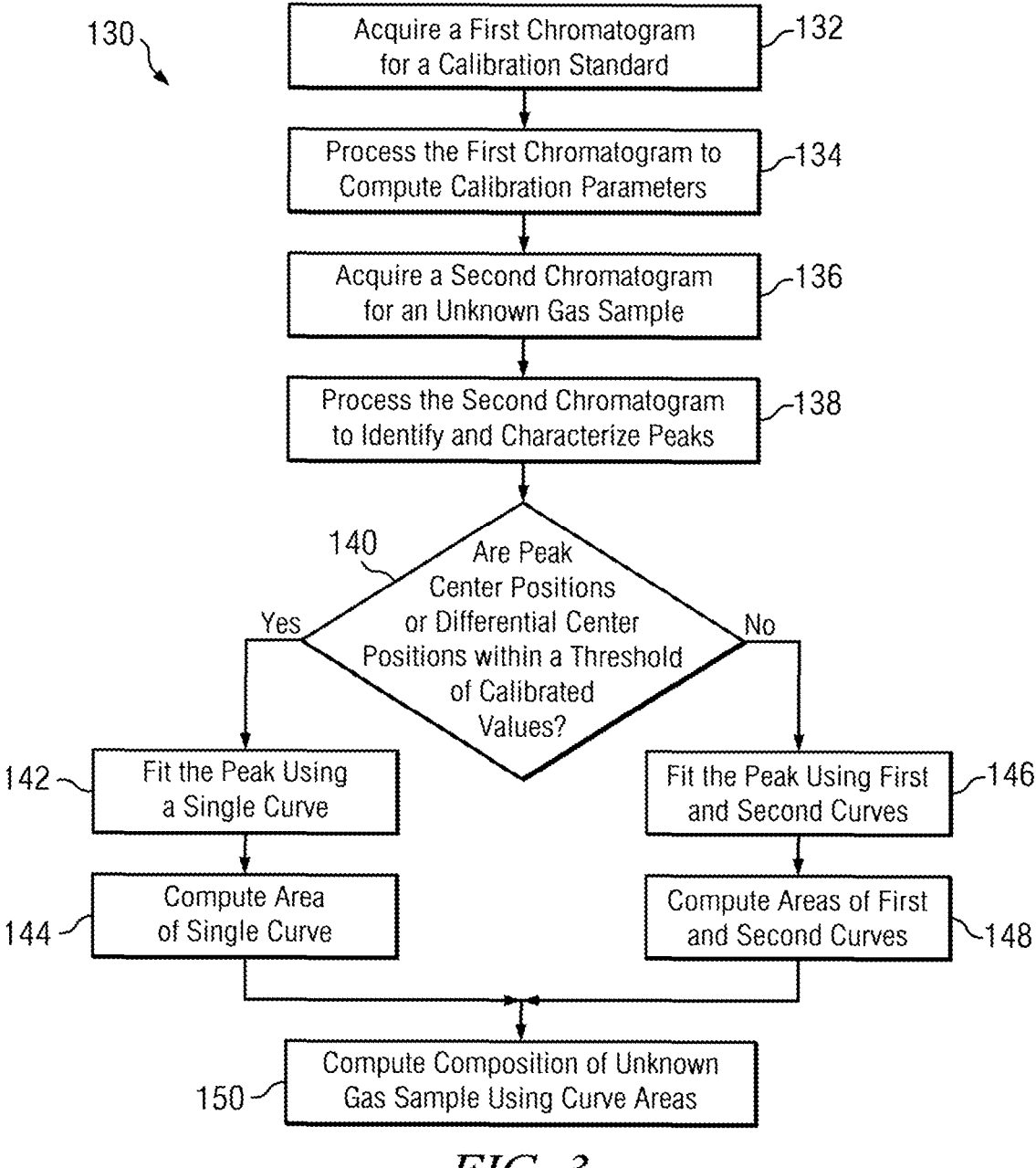

130

Acquire a First Chromatogram
for a Calibration Standard ~132

Process the First Chromatogram to
Compute Calibration Parameters ~134

Acquire a Second Chromatogram
for an Unknown Gas Sample ~136

Process the Second Chromatogram
to Identify and Characterize Peaks ~138

140 — Are Peak
Center Positions
or Differential Center
Positions within a Threshold
of Calibrated
Values?

Yes

No

142 — Fit the Peak Using
a Single Curve

Fit the Peak Using First
and Second Curves ~146

144 — Compute Area
of Single Curve

Compute Areas of First
and Second Curves ~148

150 — Compute Composition of Unknown
Gas Sample Using Curve Areas

Amplitude →

Time →

2 4 6 8 10 12 14 16 18

250

252 Divide Chromatogram into a Plurality of Time Intervals

254 Segment Each Time Interval

256 Estimate Noise Level of the Chromatogram

258 Identify Potential Peaks by a Change in Sign of Adjacent Segments

260 Select Peaks Having Amplitude Greater than Multiple of Estimated Noise

Amplitude

Time

AUTOMATED CONTAMINANT SEPARATION IN GAS CHROMATOGRAPHY

CROSS REFERENCE TO RELATED APPLICATIONS

This application is the National Stage Entry of International Application No. PCT/IB2022/000440, filed on Aug. 2, 2022.

BACKGROUND

When drilling a subterranean wellbore, circulating drilling fluid commonly carries formation fluids and dissolved formation gasses to the surface. Such gasses may be liberated by the drill bit as it cuts the formation and may include various alkane gasses such as methane, ethane, propane, butane, pentane, and the like, as well as alkenes and alcohols. The liberated gases are commonly evaluated at the surface. Such measurements may provide valuable information to a mud logger and may provide information about the maturity and nature of hydrocarbons in the reservoir, compartmentalization of intervals in the reservoir being drilled, and oil quality, as well as information regarding production zones, lithology changes, history of reservoir accumulation, or seal effectiveness.

The relative composition of alkane gases can be of particular interest to the mud logger. For example, the relative concentration of alkane gases (or ratios of one alkane gas to another) is commonly used to characterize the formation and formation fluid. While gas chromatography is commonly used to evaluate formation gas composition, the presence of contaminates can be problematic to the evaluation. For example, the presence of alkene gases such as ethylene, propylene, and butylene in the formation gas can introduce measurement errors and increase the difficulty in obtaining compositional information. There is a need in the industry for improved gas chromatography measurement methods, particularly for evaluating formation gases including light alkanes.

BRIEF DESCRIPTION OF THE DRAWINGS

For a more complete understanding of the disclosed subject matter, and advantages thereof, reference is now made to the following descriptions taken in conjunction with the accompanying drawings, in which:

FIG. 2 depicts a flow chart of one example method for evaluating a gas sample from a chromatogram.

FIG. 3 depicts a flow chart of another method for evaluating a gas sample from a chromatogram.

DETAILED DESCRIPTION

A method is disclosed for evaluating an unknown gas sample. The method includes acquiring a chromatogram of the unknown gas sample and processing the chromatogram to identify a peak. The peak is evaluated to determine if it is representative of a single gas species in the unknown gas sample. The peak is fit with at least first and second curves when the peak is not representative of a single gas species. First and second areas under the corresponding first and second curves are computed and processed to compute a composition of the unknown gas sample or a ratio of concentrations of individual gases in the unknown gas sample. The method may be advantageously implemented automatically without human interaction or input.

Figure 1:
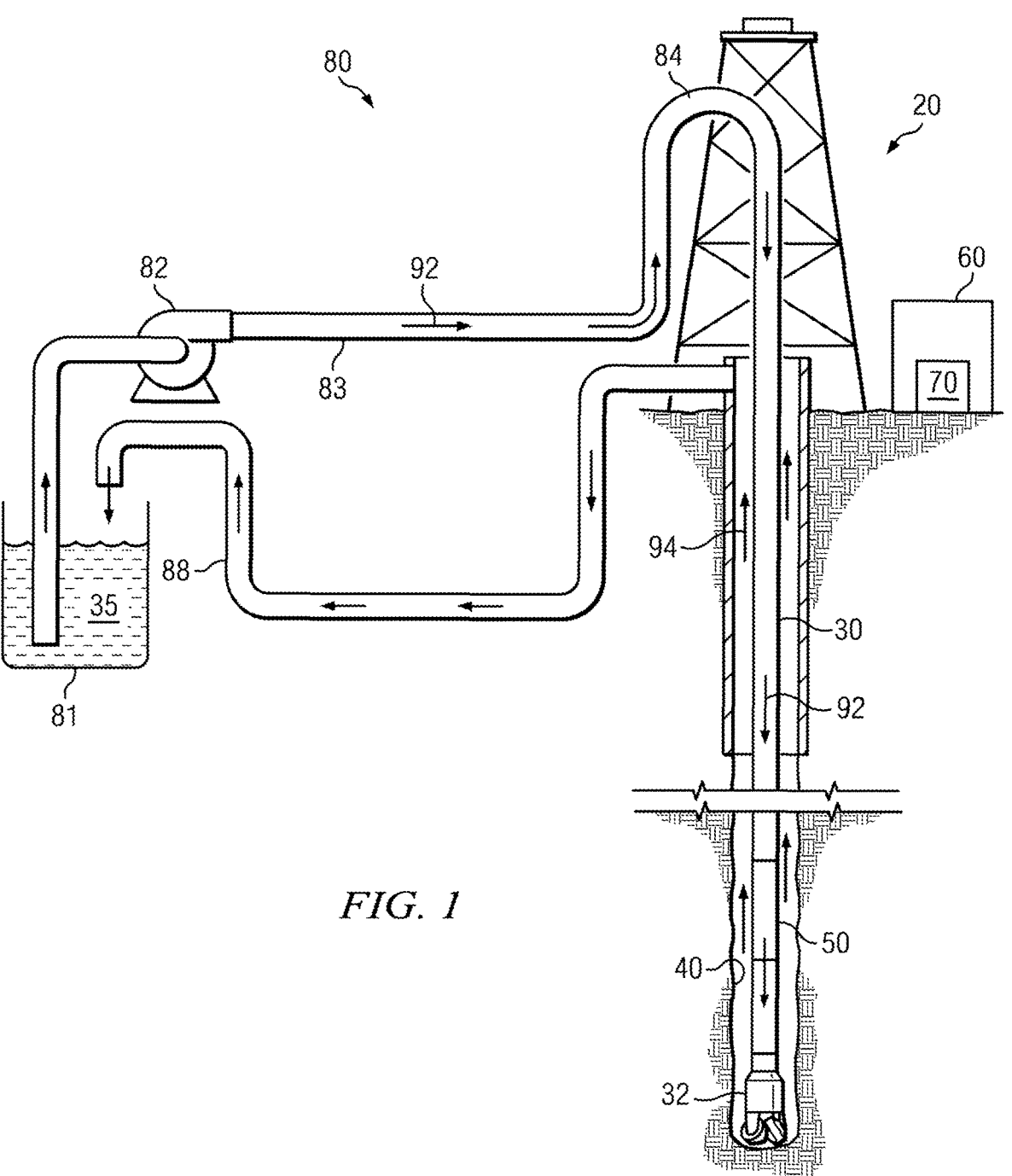
FIG. 1 depicts an example drilling rig including a disclosed gas chromatography apparatus for measuring a composition of formation gas.

FIG. 1 depicts an example drilling rig 20 including a gas chromatography apparatus 70 for evaluating formation gas composition. The drilling rig 10 may be positioned over a subterranean formation (not shown). The rig may include, for example, a derrick and a hoisting apparatus (also not shown) for raising and lowering a drill string 30, which, as shown, extends into wellbore 40 and includes, for example, a drill bit 32 and one or more downhole measurement tools 50 (e.g. a logging while drilling tool or a measurement while drilling tool). Suitable drilling systems, for example, including drilling, steering, logging, and other downhole tools are well known in the art. Drilling rig 20 further includes a surface system 80 for controlling the flow of drilling fluid used on the rig (e.g., used in drilling the wellbore 40). In the example rig depicted, drilling fluid 35 is pumped downhole (as depicted at 92) via a conventional mud pump 82. The drilling fluid 35 may be pumped, for example, through a standpipe 83 and mud hose 84 in route to the drill string 30. The drilling fluid typically emerges from the drill string 30 at or near the drill bit 32 and creates an upward flow 94 of mud through the wellbore annulus (the annular space between the drill string and the wellbore wall). The drilling fluid then flows through a return conduit 88 to a mud pit 81. It will be appreciated that the terms drilling fluid and mud are used synonymously herein.

The disclosed embodiments include methods and systems for evaluating the composition of formation gas while drilling a wellbore. By formation gas, it is meant that the gas originates in the subterranean formation. As is known to those of ordinary skill in the art, the formation gas may be released into the wellbore 40 via the drilling process (e.g., crushing the formation rock by the mechanical action of the drill bit) and may also migrate into the wellbore 40, for example, via fractures in the formation rock. Once in the wellbore, the formation gas may be transported to the surface via the drilling fluid (in the upwardly flowing fluid 94). The formation gas may be sampled in the surface system, for example, via one or more drilling fluid degassers (not shown) deployed, for example, in the return conduit 88 or the mud pit 91 and/or a head space gas probe (not shown) deployed, for example, in the return conduit 88. The disclosed embodiments are expressly not limited in regards to how the gas is sampled.

With further reference to FIG. 1, drilling rig 20 may further include a testing facility 60 (e.g., a laboratory trailer including one or more instruments suitable for making various measurements of drill cuttings and formation gases in the drilling fluid). In the depicted embodiment, the testing facility 60 includes a gas chromatography apparatus 70 (described in more detail below) configured evaluate the formation gas composition. The testing facility 60 may, of course, include numerous other testing instruments known to those of ordinary skill in the industry. It will be appreciated that disclosed embodiments may make use of substantially any suitable gas chromatography (GC) apparatus including, for example, vapor-phase chromatography (VPC), gas-liquid partition chromatography (GLPC), flame-ionization detection (FID) chromatography, GC mass spectroscopy, and the like.

In general, a suitable GC apparatus may include an injector port, a column including a stationary phase, and a detector. As known to those of ordinary skill, the injector port may be configured to receive a gas sample in a carrier gas stream (e.g., such as a nitrogen, argon, hydrogen, or helium gas stream). The carrier gas and received gas sample may be transported through the column and stationary phase to the detector. In certain embodiments, the column may be (but is not necessarily) located in an oven. Those of ordinary skill will also readily appreciate that the column and stationary phase are intended to separate the various gas species such that they arrive at the detector at distinct elution times.

While GC is a powerful chemical analysis technique that enables many (most) chemical species to be separated at the detector, there remains room for improvement. In many gas samples, such as those including light hydrocarbons, certain species can have partially or fully overlapping elution times. This results in overlapping peaks in the chromatogram and tends to complicate quantitative determination of the gas composition. For example, in gas samples including light hydrocarbons, ethane and ethylene peaks commonly overlap (as do propane and propylene or butane and butylene peaks). While methods are known for estimating the contribution of each of the overlapping species, such methods generally involve manual effort. Such manual effort is time consuming and expensive and is not well suited for repeated evaluation of a gas stream (such as when evaluating gas samples obtained during a drilling operation). There is a need in the industry for a fully automated methodology.

Figure 4:
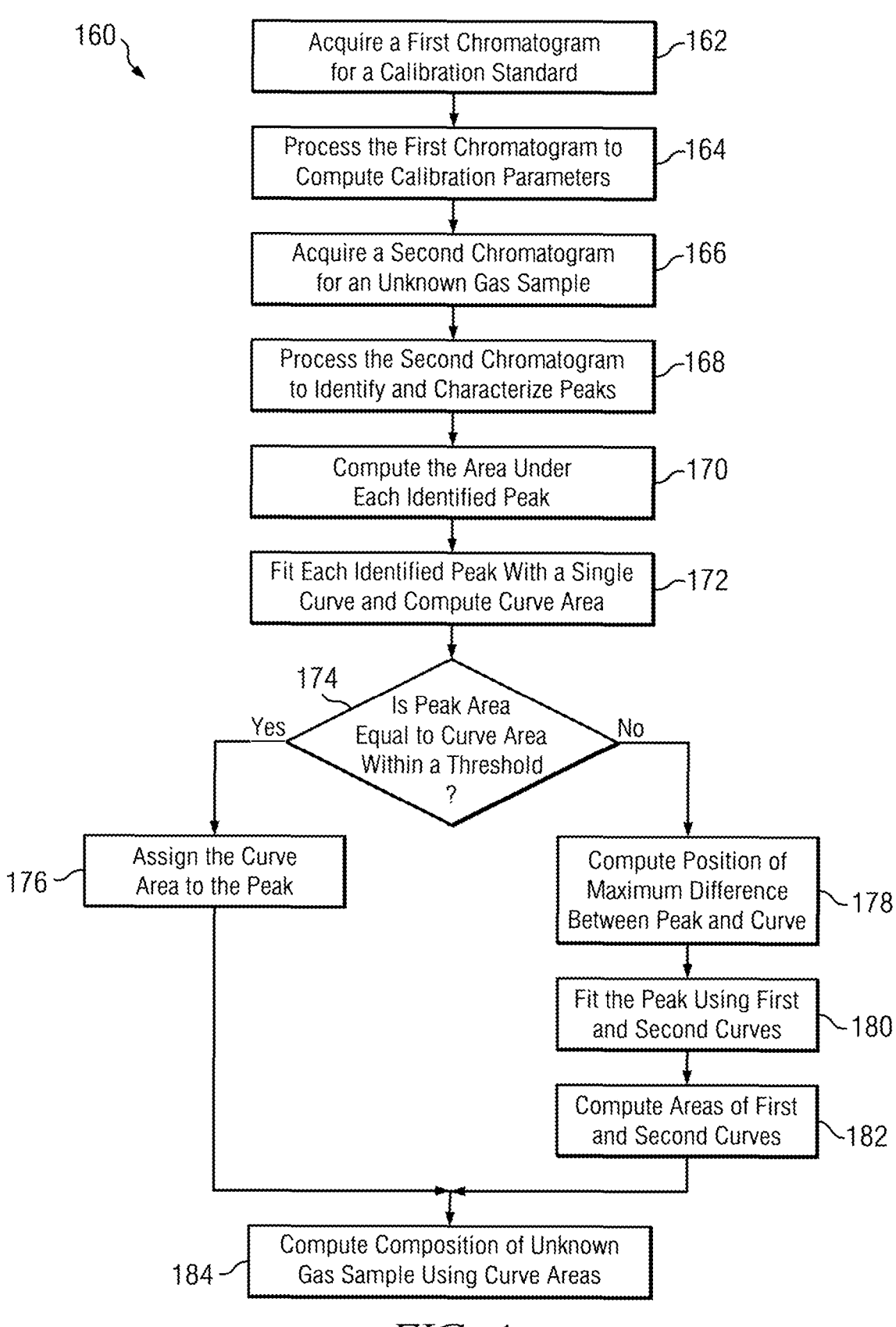
FIG. 4 depicts a flow chart of still another method for evaluating a gas sample from a chromatogram.

FIGS. 2, 3, and 4 depict flow charts of example methods 100, 130, and 160 for evaluating a gas sample from a gas chromatogram (e.g., using gas chromatography). In FIG. 2, a chromatogram is acquired for an unknown gas sample at 102. The chromatogram may be evaluated (processed) at 104 to identify peaks in the chromatogram and to determine various parameters of each of the identified peaks (e.g., amplitudes, center positions, standard deviations, shapes or skews, and areas of each peak). Selected ones of the identified peaks may be evaluated at 106 to determine if each selected peak is representative of a single species or more than one (e.g., two) distinct species in the unknown gas sample. For example, the center position, shape, standard deviation, skew, or area of the peak may be evaluated against various threshold values or calibration standards. In certain example embodiments the evaluation at 106 may include comparing the selected peaks with corresponding peaks in a calibration chromatogram (for example comparing the center position or standard deviation of the peak with the corresponding calibration peak).

With continued reference to FIG. 2, peaks that are determined to be representative of a single gas species are fit with a single curve (e.g., a standard function such as a Gaussian) at 108 and processed to compute a peak area at 110. Peaks that are determined to be representative of a plurality of distinct gas species are fit using first and second curves at 112. The parameters of the curves may be selected, for example, based on calibration peak parameters and/or original peak parameters. The areas of the first and second curves are then computed at 114. A composition of the gas sample or a ratio of the concentrations of individual gases in the sample may be computed at 116 by processing the areas of the curves determined in 110 and 114 using techniques known to those of ordinary skill in the art (e.g., by processing a ratio or ratios of the areas).

In FIG. 3 a first chromatogram is acquired for a known calibration gas sample at 132 and processed at 134 to determine at least one calibration parameter. Such calibration parameters may include, for example, amplitudes, center positions, standard deviations, and areas of each of the peaks in the first chromatogram (the calibration chromatogram). A second chromatogram is acquired for an unknown gas sample at 136 and processed at 138 to identify peaks in the chromatogram and to determine various parameters of each of the identified peaks (e.g., as described above with respect to FIG. 2). Selected ones of the identified peaks in the second chromatogram are evaluated at 140 to determine if center positions of each evaluated peak are within threshold values of corresponding peaks in the first chromatogram (the calibration peaks). In certain example embodiments, differential center positions may be evaluated at 140. By differential center positions it is meant the difference in a center position of a first peak and the center position of a second peak. For example, for a gas sample including light hydrocarbons, the differential center position may be the difference between the higher peak center positions and the C1 center position (e.g., C2-C1, C3-C1, iC4-C1, nC4-C1, etc.).

With continued reference to FIG. 3, peaks that have a center position or differential center position within the threshold are fit with a single curve (e.g., a standard function such as a Gaussian) at 142. The single curve is then processed at 144 to compute a peak area. Peaks that have a center position or differential center position that is outside of the threshold (e.g., a difference is greater than the threshold) are fit using first and second curves at 146. The first curve may be assigned a center position or differential center position equal to that of the original peak and the second curve may be assigned a center position or differential center position equal to that of the center position or differential center position of the corresponding calibration peak. The areas of the first and second curves are then computed at 148. A composition of the gas sample or a ratio of the concentrations of individual gases in the sample may be computed at 150 by processing the areas of each of the fitting curves computed in 144 and 148 (as well as areas under the calibration peaks computed in 134) using techniques known to those of ordinary skill in the art (e.g., by processing ratio of the areas).

FIG. 4 is similar to FIG. 3 in that a first chromatogram is acquired for a known calibration gas sample at 162 and processed at 164 to determine at least one calibration parameter. A second chromatogram is acquired for an unknown gas sample at 166 and processed at 168 to identify peaks in the chromatogram and to determine various parameters of each of the identified peaks. First and second peak areas are computed for selected ones of the identified peaks at 170 and 172. The first peak area computed at 170 is the true area under each of the peaks. Each of the identified peaks is also fit using a single curve (such as a Gaussian). The second peak areas computed at 172 are the areas under the single fitting curve for each peak.

With continued reference to FIG. 4, the first and second peak areas are compared (e.g., by computing a difference or a ratio of the areas) for each of the selected peaks at 174. Peaks for which the comparison of the first and second areas is within a corresponding threshold (e.g., when a difference between the areas is less than a threshold or a ratio of the peaks is close to unity) are assigned the second peak area (the area under the single fitting curve) at 176. Peaks for which the comparison of the first and second areas is outside of the threshold (e.g., a difference between the areas exceeds a threshold or a ratio is not close to unity) are fit again using first and second fitting curves at 180. The first curve may be assigned a center position (or differential center position) equal to that of the original peak. The second curve may be assigned a center position (or differential center position) equal to a position (elution time) at which a difference between the peak itself and the single fitting curve is a maximum (as computed at 178). The standard deviations of the first and second curves may be set equal to the standard deviation of the corresponding peak in the calibration chromatogram. The areas of the first and second curves are then computed at 182. A composition of the gas sample or a ratio of the concentrations of individual gases in the sample may be computed at 184 by processing the areas of the fitting curves assigned and computed at 176 and 182.

It will be appreciated that the unknown gas sample may include substantially any gases; however, the disclosed embodiments have been found to be particularly suitable for gas samples including light hydrocarbons. For example, a gas sample including light hydrocarbons may include methane, ethane, and propane. Gas samples including light hydrocarbons may further include, for example, iso-butane, butane, iso-pentane, and pentane. As described in more detail below, such gas samples sometimes further include contaminant gases such as ethylene, propylene, butylene, and various alcohols.

With further reference to FIGS. 2, 3, and 4, it will be understood that acquiring a chromatogram of a calibration standard or an unknown gas sample may include receiving a data file or a plot including detector amplitudes and corresponding elution times. In other embodiments, acquiring a chromatogram may include, for example, injecting a gas sample (such as a calibration standard or an unknown sample) into an injector port in a GC apparatus and causing the detector to output and/or record detector output with time thereby generating the chromatogram having detector amplitudes as a function of elution time in the GC apparatus.

Figures 5, 6:
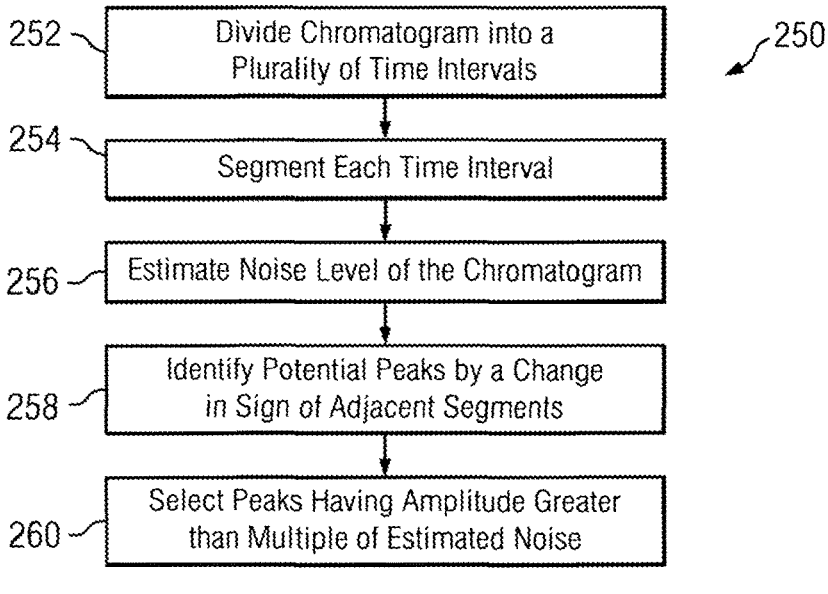
FIG. 5 depicts an example chromatogram for a calibration sample.
FIG. 6 depicts a flow chart of an example method for identifying chromatogram peaks.

With continued reference to FIGS. 2, 3, and 4, methods 100, 130, and 160 include acquiring a chromatogram for a known calibration gas sample. FIG. 5 depicts one such example calibration chromatogram for a calibration sample including a known mixture of methane (C1), ethane (C2), propane (C3), iso-butane (iC4), butane (nC4), iso-pentane (iC5), and pentane (nC5) gases. The depicted chromatogram plots detector amplitude on the vertical axis versus elution time on the horizontal axis. Calibration peaks for C1, C2, C3, iC4, nC4, iC5, and nC5 are depicted at 202, 204, 206, 208, 210, 212, and 214. The calibration chromatogram may be evaluated, for example, as described above, to determine one or more calibration parameters including, for example, amplitudes, center positions, differential center positions, standard deviations, and areas of each of the peaks in the chromatogram. Table 1 lists example calibration parameters for each of the observed calibration peaks in FIG. 4.

Figure 7:
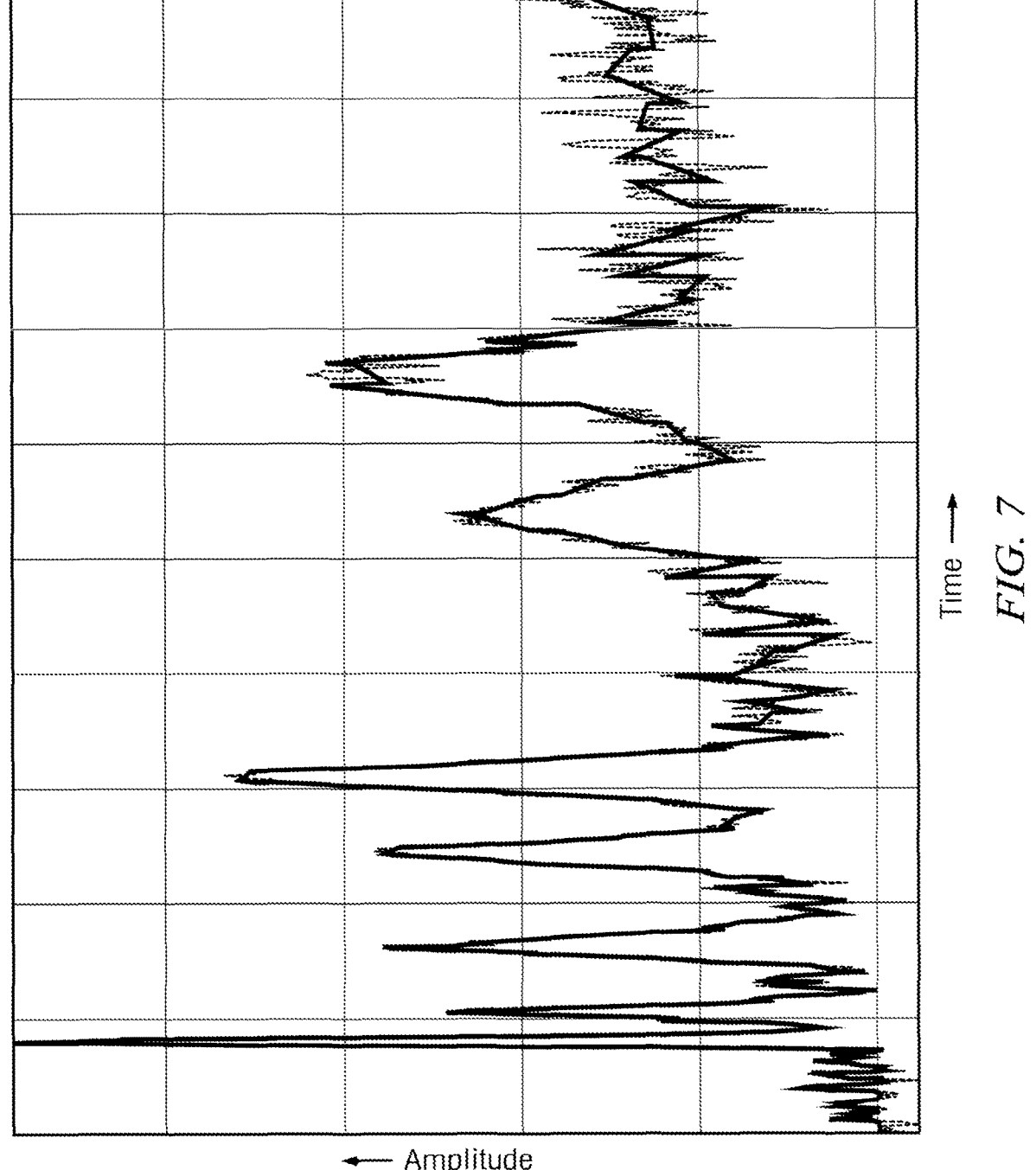
FIG. 7 depicts an example segmented chromatogram with the original data represented as a dotted line and the individual line segments represented as solid lines.

With still further reference to FIGS. 2, 3, and 4, methods 100, 130, and 160 include acquiring a chromatogram for an unknown calibration gas sample and evaluating (or processing) the chromatogram to identify and locate peaks therein. FIG. 6 depicts a flow chart of an example method 250 for identifying the chromatogram peaks at 104, 138, and 168 of methods 100, 130, and 160. The peak identification method may include dividing the chromatogram into a plurality of time intervals (elution time intervals) at 252. For example, the chromatogram may be divided into a predetermined or user defined number of intervals or into intervals having a predetermined or user defined time length. The chromatogram may then be segmented by fitting a line segment to the data in each of the time intervals at 254. FIG. 7 depicts an example segmented chromatogram with the original data represented as a dotted line and the individual line segments represented as solid lines.

With continued reference to FIG. 6, the example peak identification method further includes estimating a noise level of the chromatogram at 256. For example, the noise at any elution time may be estimated as an absolute value of a difference between the signal (data) at that time and the value of the line segment at that time. The noise of the chromatogram (or a region thereof) may be estimated, for example, by computing an average (e.g., a mean, a median, or a mode) of the differences over all data points in the chromatogram (or over all data points in a selected region of the chromatogram). In one example embodiment, the noise may be computed as follows:

$$noise = median\left( \left| y_i^{signal} - y_i^{segmentation} \right|_{\{i \in [0; N]\}} \right)$$

where the computed noise is the median of the absolute value of the difference between each data point $y_i^{signal}$ and the corresponding value of the line segment $y_i^{segmentation}$ over all the data points $\{i \in [0; N]\}$ in the chromatogram or selected region thereof. Note that the noise may be computed over the entire chromatogram, including the peaks. Potential peaks are identified at 258 by a change in sign (e.g., positive to negative) of the slope of adjacent segments. A peak height may then be computed for each of the potential peaks. Potential peaks having a peak height that exceeds a predetermined (or user selected) multiple of the noise may be positively identified and selected at 260. For example only, the peaks may be positively identified when the peak height is at least two (e.g., at least 5, 10, 15, or 20) times greater than the estimated noise.

Figures 8A, 8B:
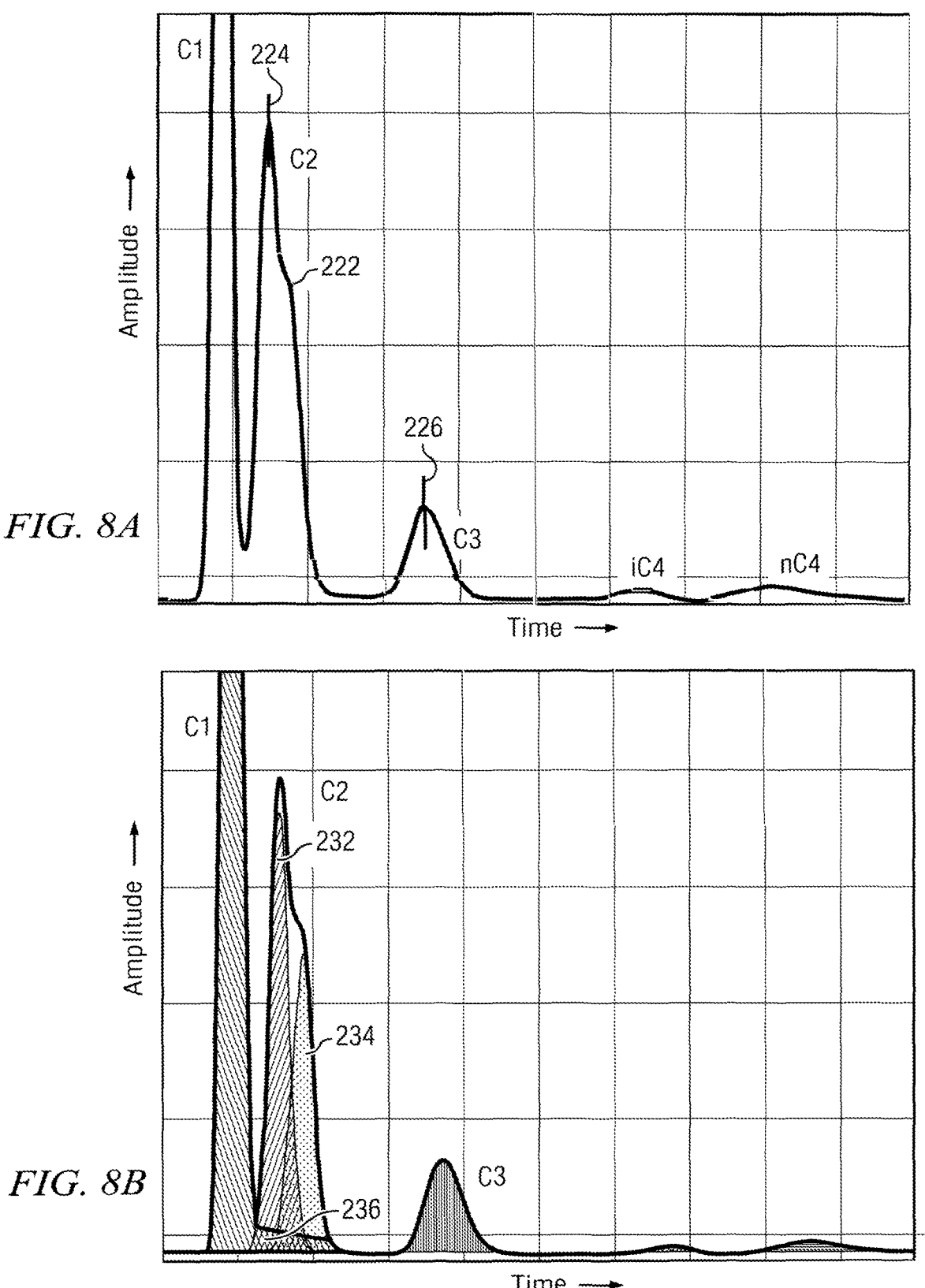
FIGS. 8A and 8B (collectively FIG. 8) depict a chromatogram of an example formation gas sample including both ethylene and ethane used to further illustrate the method depicted on FIG. 3.

With reference again to FIG. 3 and further reference to FIGS. 8A and 8B, method 130 is now described in more detail with respect to the following non-limiting example. FIG. 8A depicts a chromatogram of an example formation gas sample including both ethylene and ethane. Ethylene may be referred to herein as a contaminant since it was not included in the calibration standard. The C1, C2, C3, iC4, and nC4 peaks are depicted as indicated (the iC5 and nC5 peaks are not shown). Note that the C2 peak appears to have a shoulder on the right-hand side thereof at 222 (thereby indicating a potential contaminant). In method 130 (FIG. 3), the peak center positions of each peak may be identified at 108, for example, via the above described method 250 (FIG. 6). In this example, the center positions (the elution times at maximum peak height) were indicated by a change in sign of the slope of adjacent segments (from a positive slope to a negative slope). The center positions found at 108 are also shown on FIG. 8A and are indicated by corresponding vertical lines at 224 and 226 for the C2 and C3 peaks.

With continued reference to FIG. 8A, differential center positions of each of the identified peaks (with the exception of the C1 peak) were compared to corresponding differential center positions of the calibration peaks (not shown). In this particular example the differential center positions were determined by subtracting the C1 center position from the peak center position. Table 1 lists the differential center positions (DSP Sample) for each of the C2, C3, iC4, and nC4 peaks shown on FIG. 8A and the corresponding calibrated differential center positions (DSP Cal) for the calibrated peaks shown on FIG. 5. Table 1 also lists the absolute value of the difference between the sample DCP and the calibrated DSP (Difference) and example threshold values (Threshold) for each of the peaks.

TABLE 1

| Peak | DCP Sample (sec) | DCP Cal. (sec) | Difference (sec) | Threshold (sec) |
|------|------------------|----------------|------------------|-----------------|
| C2   | 0.45             | 0.69           | 0.24             | 0.12            |
| C3   | 2.08             | 2.18           | 0.1              | 0.3             |
| iC4  | 4.34             | 4.33           | 0.01             | 0.6             |
| nC4  | 5.71             | 6.12           | 0.41             | 0.8             |

As listed in Table 1, the differential center position differences of the C3, iC4, and nC4 peaks were less than the threshold values (i.e., with the corresponding threshold values). While not shown, the differential center position differences of the iC5 and nC5 peaks were also less than corresponding thresholds. Each of these peaks was then fit with single curve at 142 and the area under the fitting curve was computed at 144 of FIG. 3. The C1 peak was also fit with a single curve at 142 and the area computed at 144. In this particular example, a Gaussian curve was used to fit the C1, C3, iC4, nC4, iC5, and nC5 peaks, however, the disclosed embodiments are not limited in this regard. The peaks may also (or alternatively) be fit with other functions such as a Lorentzian, an asymmetric Gaussian or Lorentzian, or a modified Gaussian or Lorentzian. Moreover, as described in more detail below, the C1 peak may sometimes be partially fit with an asymmetric tail at higher elution times.

As also listed in Table 1, the differential center position of the C2 peak exceeded the threshold (i.e., was outside the threshold). The C2 peak was therefore fit using first and second curves 232 and 234 as depicted in FIG. 8B. In this particular embodiment the fit also further included an asymmetric tail 236 extending to the right of the C1 peak and overlapping with the C2 peak. A center position of the first curve 232 was set to an elution time of 2.29 seconds such that the differential center position was equal to that of the original C2 peak (0.45 seconds). The center position of the second curve 234 was set to an elution time of 2.53 seconds such that the differential center position was equal to that of the calibration C2 peak (0.69 seconds). The areas of each of the first and second curves were then computed at 148. The first and second curves in this example were both Gaussians, but could have included other functions as described above. The C1, C3, iC4, and nC4 peaks were each fit using a standard Gaussian curve. The composition of the sample was computed based on the curve areas that were computed at 144 and 148.

Figures 9A, 9B:
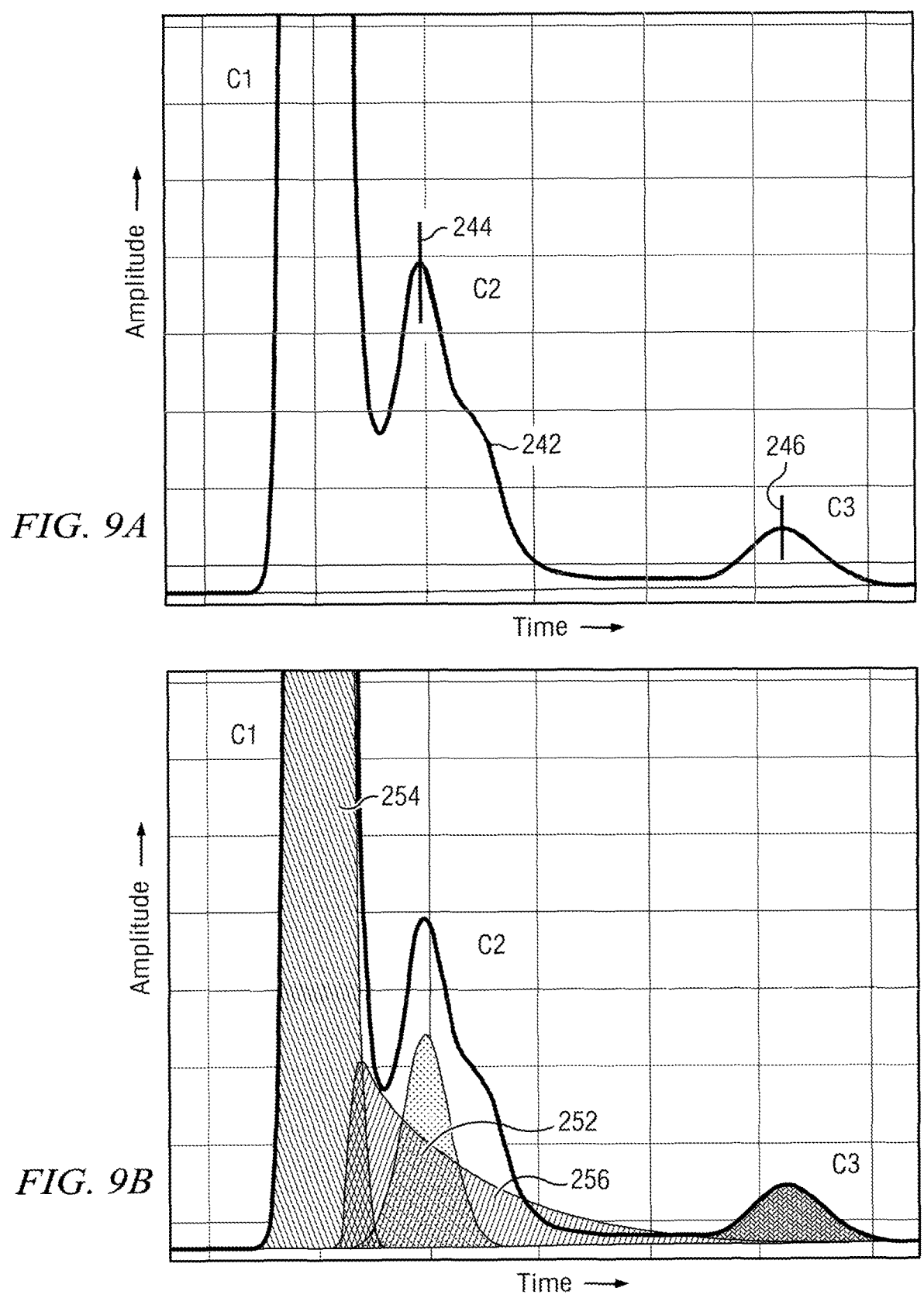
FIGS. 9A, 9B, 9C, and 9D (collectively FIG. 9) depict a chromatogram of an example formation gas sample including both ethylene and ethane used to further illustrate the method depicted on FIG. 4.

With reference again to FIG. 4, and further reference to FIGS. 9A, 9B, 9C, and 9D (FIG. 9) method 160 is now described in more detail with respect to the following non-limiting example. FIG. 9A depicts a chromatogram of an example formation gas sample including both ethylene and ethane. The C1, C2, and C3 peaks are depicted as indicated (the iC4, nC4, iC5 and nC5 peaks are not shown for clarity but were present in the original chromatogram). Note that as with the previous example, the C2 peak appears to have a shoulder 242 on the right-hand side thereof (thereby indicating a potential contaminant). In method 160, the peak center positions are found, for example, via the above described method 250. In this example, the center positions (the elution times at maximum peak height) were indicated by a change in sign of the slope of adjacent segments (from a positive slope to a negative slope). The center positions found at 168 are also shown on FIG. 9A and are indicated by corresponding vertical lines in the C2 and C3 peaks at 244 and 246.

Figures 9C, 9D:

FIG. 9B depicts the chromatogram of FIG. 9A in which each of the C2 and C3 peaks have been fit with a single curve (the C2 peak is labelled as 252). In this particular example embodiment, the C1 peak was fit using both a standard Gaussian and an additional asymmetric Gaussian Tail function as indicated at 254 and 256. In compositions in which the concentration of C1 is much greater than C2, C3, etc., the use of an asymmetric Gaussian Tail function may be used to reduce overestimation of C2 and C3. Of course, the disclosed embodiments are not limited in this regard and C1 may also be fit using a single function (such as a Gaussian or Lorentzian). As further depicted on FIG. 9B, the area under the C2 peak itself was computed to be significantly greater than the area under the C2 fitting curve such that the area difference (or ratio) was outside of the threshold. In this example the area under the C2 peak was greater than the sum of the curve 252 and the portion of curve 256 within the time interval of the C2 peak. FIG. 9C depicts the original chromatogram at 262 and the sum of the fitting curves at 264. Note the unfit shoulder region 266 remaining in the C2 curve.

With reference again to FIG. 9B, the C3 peak area was computed to be approximately equal to the area under the C3 fitting curve such that the area difference (or ratio) was within the threshold. And while not depicted on FIG. 9B, the iC4, nC4, iC5, and nC5 peak area differences (or ratios) were also computed to be within corresponding threshold values.

Returning to FIG. 9C, the location at which the difference between the value of the chromatogram signal (the data) and the single fitting curve (in this example the sum of the single curve 252 and the asymmetric Gaussian Tail 256 (FIG. 9B) was a maximum is further indicated by the vertical line at 268. FIG. 9D depicts the chromatogram fit with the first and second curves 272, 274 and the asymmetric Gaussian Tail 256. Note that the second curve 274 has a center position equal to that indicated by 268 on FIG. 9C. The areas of the first and second C2 curves 272, 274 were then computed and used to compute the composition of the gas sample.

It will be appreciated that the disclosed embodiments may further include a system for estimating a concentration of a gas sample (e.g., from an acquired chromatogram). Such a system may include computer hardware and software configured to process an acquired chromatogram. They system may further include a GC apparatus configured to measure a chromatogram from a gas sample. The hardware may include one or more processors (e.g., microprocessors) which may be connected to one or more data storage devices (e.g., hard drives or solid state memory) and user interfaces. The hardware and software may be configured automatically process an acquired chromatogram to estimate a concentration of the gas sample. It will be further understood that the disclosed embodiments may include processor executable instructions stored in the data storage device. The disclosed embodiments are, of course, not limited to the use of or the configuration of any particular computer hardware and/or software.

It will be understood that the present disclosure includes numerous embodiments. These embodiments include, but are not limited to, the following embodiments.

In a first embodiment, a method for evaluating an unknown gas sample, the method comprising: acquiring a chromatogram of the unknown gas sample; processing the chromatogram to identify a peak; evaluating the peak to determine if the peak is representative of a single gas species in the unknown gas sample; fitting the peak with first and second curves and computing first and second areas under the corresponding first and second curves when the peak is not representative of a single gas species; and processing the first and second areas to compute a composition of the unknown gas sample or a ratio of concentrations of individual gases in the unknown gas sample.

A second embodiment may include the first embodiment wherein the processing the chromatogram comprises processing the chromatogram to identify a plurality of peaks; at least one of the plurality of peaks is not representative of a single gas species and at least one other of the plurality of peaks is representative of a single gas species; and the method further comprises fitting each of the at least one other of the plurality of peaks with a single curve and computing an area under the single curve.

A third embodiment may include any one of the first through second embodiments, wherein the processing the chromatogram, the evaluating the peak, the fitting the peak, and the processing the first and second areas are performed automatically without human intervention.

A fourth embodiment may include any one of the first through third embodiments, wherein the processing the chromatogram to identify the peak comprises: dividing the chromatogram into a plurality of time intervals; segmenting chromatogram data in each of the plurality of time intervals to obtain a plurality of segments; estimating a noise level of the chromatogram data; identifying potential peaks by a sign change of slopes of adjacent ones of the plurality of segments; and selecting at least one of the potential peaks having an amplitude greater than a preselected multiple of the estimated noise level.

A fifth embodiment may include the fourth embodiment wherein the estimating the noise level comprises: computing absolute values of differences between the chromatogram data at selected times and values of the corresponding segments at the selected times; and computing an average of the absolute values of the differences at the selected times in the chromatogram.

A sixth embodiment may include any one of the first through fifth embodiments, wherein the unknown gas sample comprises light hydrocarbons including at least methane, ethane, and propane; a methane peak is fit with a symmetric curve and an asymmetric curve; the evaluating comprises evaluating an ethane peak or a propane peak to determine if the peak is representative of a single gas species in the unknown gas sample; and the fitting comprises fitting the peak with first and second curves in addition to the asymmetric curve and computing first and second areas under the corresponding first and second curves when the peak is not representative of a single gas species.

A seventh embodiment may include any one of the first through sixth embodiments, wherein the evaluating the peak comprises: automatically comparing a center position or a differential center position of the peak with a calibration center position or a calibration differential center position; automatically determining that the peak is representative of a single gas species when the comparison between the center position and the calibration center position or the comparison between the differential center position and the calibration differential center position is within a threshold; and automatically determining that the peak is not representative of a single gas species when the comparison between the center position and the calibration center position or the comparison between the differential center position and the calibration differential center position is outside of the threshold.

An eighth embodiment may include the seventh embodiment, further comprising: acquiring a calibration chromatogram of a calibration gas sample; and processing the calibration chromatogram to determine the calibration center position or the calibration differential center position.

A ninth embodiment may include any one of the seventh through eighth embodiments, wherein the fitting the peak with the first and second curves further comprises: assigning a first center position or a first differential center position to the first curve that is equal to the center position or the differential center position of the peak; assigning a second center position or a second differential center position to the second curve that is equal to the calibration center position or the calibration differential center position; and fitting the peak with first and second curves having the assigned first and second center positions.

A tenth embodiment may include any one of the first through ninth embodiments, wherein the evaluating the peak and fitting the peak with the single curve comprises: automatically computing an area under the peak; automatically fitting the peak with a single curve and computing an area under the single curve; automatically comparing the area under the peak and the area under the single curve; automatically determining that the peak is representative of a single gas species when the comparison between the area under the peak and the area under the single curve is within the threshold and assigning the area under the curve to the peak; and automatically determining that the peak is not representative of a single gas species when the comparison between the area under the peak and the area under the single curve is outside the threshold.

An eleventh embodiment may include the tenth embodiment, wherein the fitting the peak with the first and second curves comprises: assigning a first center position to the first curve that is equal to a center position of the peak; assigning a second center position to the second curve that is equal to a position of a maximum difference between the peak and the single curve; fitting the peak with first and second curves having the assigned first and second center positions.

A twelfth embodiment may include the eleventh embodiment, wherein the method further comprises acquiring a calibration chromatogram of a calibration gas sample and processing the calibration chromatogram to determine the calibration standard deviation of the peak; and the first and second curves are assigned a standard deviation that is equal to the calibration standard deviation of the peak.

In a thirteenth embodiment a system for automatically estimating a concentration of a gas sample comprises: a gas chromatography apparatus configured to generate a chromatogram of the gas sample; and a processor configured to automatically: receive the chromatogram from the gas chromatography apparatus; process the chromatogram to identify a peak; evaluate the peak to determine if the peak is representative of a single gas species in the unknown gas sample; fit the peak with first and second curves and compute first and second areas under the corresponding first and second curves when the peak is not representative of a single gas species; and process the first and second areas to compute a composition of the unknown gas sample or a ratio of concentrations of individual gases in the unknown gas sample.

A fourteenth embodiment may include the thirteenth embodiment, wherein the processor is configured to automatically evaluate the peak by: automatically comparing a center position or a differential center position of the peak with a calibration center position or a calibration differential center position; automatically determining that the peak is representative of a single gas species when the comparison between the center position and the calibration center position or the comparison between the differential center position and the calibration differential center position is within a threshold; and automatically determining that the peak is not representative of a single gas species when the comparison between the center position and the calibration center position or the comparison between the differential center position and the calibration differential center position is outside of the threshold.

A fifteenth embodiment may include the fourteenth embodiment, wherein the fit the peak with the first and second curves further comprises: assigning a first center position or a first differential center position to the first curve that is equal to the center position or the differential center position of the peak; assigning a second center position or a second differential center position to the second curve that is equal to the calibration center position or the calibration differential center position; and fitting the peak with first and second curves having the assigned first and second center positions or first and second differential center positions.

In a sixteenth embodiment a method for evaluating an unknown gas sample comprises: acquiring a first chromatogram of a calibration gas sample; processing the first chromatogram to identify a calibration peak and to compute a calibration center position or a calibration differential center position of the identified calibration peak; acquiring a second chromatogram of the unknown gas sample; processing the second chromatogram to identify a peak; comparing a center position or a differential center position of the peak with the calibration center position or the calibration differential center position; fitting the peak with first and second curves and computing first and second areas under the corresponding first and second curves when the comparison between the center position and the calibration center position or the comparison between the differential center position and the calibration differential center position is outside of a threshold; and processing the first and second areas to compute a composition of the unknown gas sample or a ratio of concentrations of individual gases in the unknown gas sample.

A seventeenth embodiment may include the sixteenth embodiment, wherein the processing the second chromatogram, the comparing, the fitting, and the processing the first and second areas are performed automatically without human intervention.

An eighteenth embodiment may include any one of the sixteenth through the seventeenth embodiments, wherein the fitting the peak with the first and second curves further comprises: assigning a first center position or a first differential center position to the first curve that is equal to the center position or the differential center position of the peak; assigning a second center position or a second differential center position to the second curve that is equal to the calibration center position or the calibration differential center position; and fitting the peak with first and second curves having the assigned first and second center positions.

A nineteenth embodiment may include any one of the sixteenth through the eighteenth embodiments, wherein the processing the second chromatogram to identify the peak comprises: dividing the second chromatogram into a plurality of time intervals; segmenting chromatogram data in each of the plurality of time intervals to obtain a plurality of segments; estimating a noise level of the chromatogram data; identifying potential peaks by a sign change of slopes of adjacent ones of the segments; and selecting at least one of the potential peaks having an amplitude greater than a preselected multiple of the estimated noise level.

A twentieth embodiment may include any one of the sixteenth through the nineteenth embodiments, wherein: the unknown gas sample comprises light hydrocarbons including at least methane, ethane, and propane; a methane peak is fit with a symmetric curve and an asymmetric curve; the comparing comprises comparing the center position or the differential center position of an ethane peak or a propane peak with the calibrated center position or the calibrated differential center position of the ethane peak or the propane peak; and the fitting comprises fitting the peak with the first and second curves in addition to the asymmetric curve and computing the first and second areas under the corresponding first and second curves when the ethane peak or the propane peak is not representative of a single gas species.

Although automated contaminant separation in gas chromatography has been described in detail, it should be understood that various changes, substitutions and alternations can be made herein without departing from the spirit and scope of the disclosure as defined by the appended claims.

What is claimed is:

1. A method for evaluating an unknown gas sample, the method comprising:

acquiring a chromatogram of the unknown gas sample, wherein the unknown gas sample comprises light hydrocarbons including at least methane, ethane, and propane;

processing the chromatogram to identify a peak, wherein a methane peak is fit with a symmetric curve and an asymmetric curve;

evaluating the peak to determine if the peak is representative of a single gas species in the unknown gas sample, wherein the evaluating comprises evaluating an ethane peak or a propane peak to determine if the peak is representative of a single gas species in the unknown gas sample;

fitting the peak with first and second curves and computing first and second areas under the corresponding first and second curves when the peak is not representative of a single gas species, wherein the fitting comprises fitting the peak with first and second curves in addition to the asymmetric curve and computing first and second areas under the corresponding first and second curves when the peak is not representative of a single gas species; and processing the first and second areas to compute a composition of the unknown gas sample or a ratio of concentrations of individual gases in the unknown gas sample, wherein acquiring the chromatogram includes injecting the unknown gas sample into an injector port in a gas chromatography (GC) apparatus, and wherein the methane peak has a single local maximum that is fit with the symmetric curve and the asymmetric curve.

2. The method of claim 1, wherein:

the processing the chromatogram comprises processing the chromatogram to identify a plurality of peaks;

at least one of the plurality of peaks is not representative of a single gas species and at least one other of the plurality of peaks is representative of a single gas species; and the method further comprises fitting each of the at least one other of the plurality of peaks with a single curve and computing an area under the single curve.

3. The method of claim 1, wherein the processing the chromatogram, the evaluating the peak, the fitting the peak, and the processing the first and second areas are performed automatically without human intervention.

4. The method of claim 1, wherein the processing the chromatogram to identify the peak comprises:

dividing the chromatogram into a plurality of time intervals;

segmenting chromatogram data in each of the plurality of time intervals to obtain a plurality of segments;

estimating a noise level of the chromatogram data;

identifying potential peaks by a sign change of slopes of adjacent ones of the plurality of segments; and selecting at least one of the potential peaks having an amplitude greater than a preselected multiple of the estimated noise level.

5. The method of claim 4, wherein the estimating the noise level comprises:

computing absolute values of differences between the chromatogram data at selected times and values of the corresponding segments at the selected times; and computing an average of the absolute values of the differences at the selected times in the chromatogram.

6. The method of claim 1, wherein the evaluating the peak comprises:

automatically comparing a center position or a differential center position of the peak with a calibration center position or a calibration differential center position;

automatically determining that the peak is representative of a single gas species when the comparison between the center position and the calibration center position or the comparison between the differential center position and the calibration differential center position is within a threshold; and automatically determining that the peak is not representative of a single gas species when the comparison between the center position and the calibration center position or the comparison between the differential center position and the calibration differential center position is outside of the threshold.

7. The method of claim 6, further comprising:

acquiring a calibration chromatogram of a calibration gas sample; and processing the calibration chromatogram to determine the calibration center position or the calibration differential center position.

8. The method of claim 6, wherein the fitting the peak with the first and second curves further comprises:

assigning a first center position or a first differential center position to the first curve that is equal to the center position or the differential center position of the peak;

assigning a second center position or a second differential center position to the second curve that is equal to the calibration center position or the calibration differential center position; and fitting the peak with first and second curves having the assigned first and second center positions.

9. The method of claim 1, wherein the evaluating the peak and fitting the peak comprises:

automatically computing an area under the peak;

automatically fitting the peak with a single curve and computing an area under the single curve;

automatically comparing the area under the peak and the area under the single curve;

automatically determining that the peak is representative of a single gas species when the comparison between the area under the peak and the area under the single curve is within a threshold and assigning the area under the curve to the peak; and automatically determining that the peak is not representative of a single gas species when the comparison between the area under the peak and the area under the single curve is outside the threshold.

10. The method of claim 9, wherein the fitting the peak with the first and second curves comprises:

assigning a first center position to the first curve that is equal to a center position of the peak;

assigning a second center position to the second curve that is equal to a position of a maximum difference between the peak and the single curve; and fitting the peak with first and second curves having the assigned first and second center positions.

11. The method of claim 10, wherein:

the method further comprises acquiring a calibration chromatogram of a calibration gas sample and processing the calibration chromatogram to determine the calibration standard deviation of the peak; and the first and second curves are assigned a standard deviation that is equal to the calibration standard deviation of the peak.

12. The method of claim 1, wherein the GC apparatus is in a testing facility local to a drilling rig.

13. A method for evaluating an unknown gas sample, the method comprising:

acquiring a first chromatogram of a calibration gas sample;

processing the first chromatogram to identify a calibration peak and to compute a calibration center position or a calibration differential center position of the identified calibration peak;

acquiring a second chromatogram of the unknown gas sample, wherein the unknown gas sample comprises light hydrocarbons including at least methane, ethane, and propane;

processing the second chromatogram to identify a peak, wherein a methane peak is fit with a symmetric curve and an asymmetric curve;

comparing a center position or a differential center position of the peak with the calibration center position or the calibration differential center position, wherein the comparing comprises comparing the center position or the differential center position of an ethane peak or a propane peak with the calibration center position or the calibration differential center position of the ethane peak or the propane peak;

fitting the peak with first and second curves and computing first and second areas under the corresponding first and second curves when the comparison between the center position and the calibration center position or the comparison between the differential center position and the calibration differential center position is outside of a threshold, wherein the fitting comprises fitting the peak with the first and second curves in addition to the asymmetric curve and computing the first and second areas under the corresponding first and second curves when the ethane peak or the propane peak is not representative of a single gas species; and processing the first and second areas to compute a composition of the unknown gas sample or a ratio of concentrations of individual gases in the unknown gas sample, wherein acquiring the second chromatogram includes injecting the unknown gas sample into an injector port in a gas chromatography (GC) apparatus, and wherein the methane peak has a single local maximum that is fit with the symmetric curve and the asymmetric curve.

14. The method of claim 13, wherein the processing the second chromatogram, the comparing, the fitting, and the processing the first and second areas are performed automatically without human intervention.

15. The method of claim 13, wherein the fitting the peak with the first and second curves further comprises:

assigning a first center position or a first differential center position to the first curve that is equal to the center position or the differential center position of the peak;

assigning a second center position or a second differential center position to the second curve that is equal to the calibration center position or the calibration differential center position; and fitting the peak with first and second curves having the assigned first and second center positions.

16. The method of claim 13, wherein the processing the second chromatogram to identify the peak comprises:

dividing the second chromatogram into a plurality of time intervals;

segmenting chromatogram data in each of the plurality of time intervals to obtain a plurality of segments;

estimating a noise level of the chromatogram data;

identifying potential peaks by a sign change of slopes of adjacent ones of the segments; and selecting at least one of the potential peaks having an amplitude greater than a preselected multiple of the estimated noise level.

17. The method of claim 13, wherein the GC apparatus is in a testing facility local to a drilling rig.

18. The method of claim 13, wherein acquiring the first chromatogram includes injecting a first gas sample into the injector port in the GC apparatus.

\* \* \* \* \*